United States Patent Office 3,481,902
Patented Dec. 2, 1969

3,481,902
FIRE RETARDANT ELASTOMERS OF DECACHLOROOCTAHYDRO - 1,3,4 - METHENO-2H-CYCLOBUTA[cd]PENTALENE - 2 - ONE AND DIENOID POLYMERS AND METHOD FOR THEIR PREPARATION
Everett E. Gilbert, Morristown, N.J., assignor to Allied Chemical Corporation, New York, N.Y., a corporation of New York
No Drawing. Filed May 23, 1967, Ser. No. 640,482
Int. Cl. C08d 5/02
U.S. Cl. 260—66   11 Claims

ABSTRACT OF THE DISCLOSURE

Disclosed are fire retardant chlorinated elastomers which are the addition products of dienoid polymers having pendant vinyl groups and decachlorooctahydro-1,3,4-metheno-2H-cyclobuta[cd]pentalene-2-one and a method for their preparation by direct reaction of the starting materials.

---

Dienoid polymers such as polybutadiene and copolymers of butadiene with styrene, acrylonitrile or isobutylene are rubbery substances finding wide use in the manufacture of tires, shoe soles, wire coatings, hoses, tank linings, conveyor belts, and other applications where their elastic properties and abrasion resistance may be used to adavntage. These polymers, unfortunately, are flammable, and this property restricts their use in many applications for which nonflammability is a prerequisite. The prior art attempted to overcome this deficiency by physically mixing highly chlorinated organic compounds with these polymers. This has proved not to be entirely satisfactory because, although the compositions thus obtained are fire retardant, the added chlorinated compounds have a tendency to bleed out of or separate from the polymer during storage and use. This tendency to bleed is most serious in applications where such compositions are brought in direct contact with solvents which tend to leach the chlorinated filler compound out of the composition.

Presently available fire retardant polymers, as e.g., chlorinated rubbers and chlorinated aliphatics such as polyvinyl chloride and chlorinated polyethylene, do not have the elastic properties of hydrocarbon dienoid polymers. Furthermore, polyvinyl chloride and chlorinated polyethylene tend to slowly evolve hydrochloric acid under many conditions of use, which in many applications is a serious limitation. The need for new stable fire retardant elastomers therefore is obvious.

Accordingly, it is a principal object of this invention to provide novel chlorinated fire retardant elastomers.

It is another object of this invention to provide novel addition products of decachlorooctahydro-1,3,4-metheno-2H-cyclobuta[cd]pentalene-2-one with dienoid polymers having pendant vinyl groups.

Yet another object of this invention is the provision of a process for the preparation of fire resistant elastomers which are the addition products of decachlorooctahydro-1,3,4-metheno-2H-cyclobuta[cd]pentalene-2-one with dienoid polymers having pendant vinyl groups.

Other objects and advantages will be apparent from the following description.

The fire retardant elastomers of this invention may be prepared by reacting dienoid polymers having pendant vinyl groups with decachlorooctahydro-1,3,4-metheno-2H-cyclobuta[cd]pentalene-2-one, hereinafter simply referred to as DCMP, in a suitable solvent, and recovering the addition product from the reaction mixture.

DCMP is commercially available as a hydrate under the trademark "Kepone" (Allied Chemical). In anhydrous form it is a white solid which melts with decomposition at approximately 350° C. It has the empirical formula $C_{10}Cl_{10}O$, and contains 72 percent by weight of chlorine. This compound and its preparation are described in U.S. Patent Reissue 24,435. It is a caged, fully chlorinated ketone of the formula

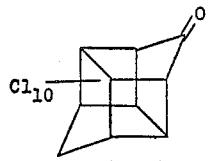

In the process of this invention the DCMP is preferably employed in anhydrous form. If available only as the hydrated product, it may be conveniently dehydrated by heating it in an oven at temperatures between about 135° C. and 150° C., or by azeotropic dehydration by refluxing it with xylene.

Dienoid polymers suitable for the preparation of the fire retardant polymers of this invention are the products of addition polymerization of diolefins having the general formula $CH_2=CX-(CH_2)_n-CX'=CH_2$ wherein X and X' are independently selected from the group consisting of hydrogen, chlorine and methyl, and wherein $n$ is a whole number of from 0 to 4, and the products of copolymerization of these diolefins with other monomers such as styrene, acrylonitrile, and isobutylene. Preferred dienoid polymers are the well known commercial elastomeric products obtained by addition polymerization of butadiene, isoprene (2-methyl-1,3-butadiene), and chloroprene (2-chloro-1,3-butadiene), and their copolymers with styrene, acrylonitrile, and isobutylene.

Dienoid polymers may carry carbon-to-carbon double bonds of two distinctly different types, viz. those located in pendant vinyl groups, resulting from 1,2-addition polymerization, and those located within the chain structure of the molecule, resulting from addition polymerization involving both terminal double bonds. The latter type of double bond hereinafter is referred to as internal double bond. In the case of polybutadiene, for example, pendant vinyl groups arise from the 1,2-addition polymerization of the monomer, involving only one of the double bonds of the monomer, and internal double bonds result from 1,4-addition polymerization of the monomer, involving both double bonds of the monomer, and causing a double bond shift to the 2-position. The proportion of pendant vinyl groups to internal double bonds is dependent upon the method of the preparation of the polymer. Dienoid polymers may be prepared having substantially all carbon-to-carbon double bonds in either pendant or internal position, or in any ratio between these extremes.

The reaction of DCMP with a pendant vinyl group of dienoid polymers may be illustrated by the following equation, wherein the dienoid polymer is 1,2-polybutadiene:

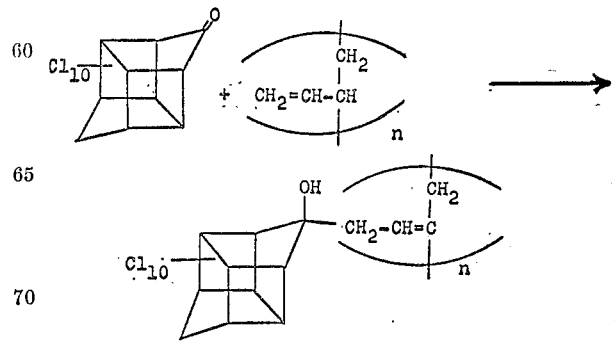

The DCMP reacts substantially only with the pendant vinyl groups of the dienoid polymer.

The arrangement of the pendant vinyl groups within the molecule of the polymer is of no consequence as far as it concerns the polymer's suitability for the preparation of the fire retardant elastomers of this invention. The reaction proceeds with equal ease with polymers having the pendant vinyl groups in syndiotactic, isotactic, or atactic arrangement. In syndiotactic arrangement the pendant vinyl groups are located in some symmetrical or recurring fashion above and below the atoms in the backbone carbon chain when the latter are arranged in a single plane, whereas in isotactic arrangement the pendant vinyl groups are all located above or below the chain. In atactic arrangement the pendant vinyl groups are not arranged in any orderly fashion.

While the reaction may be carried out in the absence of a solvent, as for example, by intimately mixing the molten dienoid polymer with finely divided DCMP under suitable conditions of temperature and agitation, the reaction is preferably carried out in the presence of an inert organic solvent which is a solvent for both DCMP and the dienoid polymer. Suitable solvents include aromatic hydrocarbons, as for example benzene, xylene, and toluene; suitable petroleum fractions; halogenated aromatic hydrocarbons, such as chlorobenzene and o-dichlorobenzene; halogenated aliphatic hydrocarbons, such as carbon tetrachloride, 1,2-dichloroethane, and pentachloroethane; and others. Xylene is a preferred solvent.

The reaction temperature is not critical and may vary between about 20° C. and about 300° C. Temperatures between about 50° C. and about 200° C. are preferred. Most conveniently the reaction is carried out at the reflux temperature of the reaction mixture at atmospheric pressure, at which temperature the reaction times vary between about 5 and about 40 hours. Since the speed of reaction is a function of the reaction temperature and increases with increased reaction temperature, temperatures higher than the reflux temperature of the reaction mixture at atmospheric pressure may suitably be employed by conducting the reaction under super-atmospheric pressures in suitable pressure reaction vessels.

The molar ratio of the dienoid polymer to the DCMP is not critical. Choice of the reactant molar ratio affords a means of controlling the desired degree of chlorination of the dienoid polymer. Where it is desired to insure substantially complete addition of the chlorinated moiety supplied by the DCMP to available pendant vinyl groups of the dienoid polymer, an excess of DCMP is preferably employed. Use of an excess of the polymer results in only partial chlorination at the available pendant vinyl groups. Suitably the reactants may be employed in a weight ratio of from 0.2 to 20 parts of decachlorooctahydro-1,3,4-metheno-2H-cyclobuta[cd]pentalene-2-one per part of dienoid polymer having pendant vinyl groups.

The degree of chlorination, and thus the degree of fire retardance of the polymers of this invention, may be controlled in two ways: (1) by the degree to which the pendant vinyl groups are reacted with the DCMP, as explained above, and (2) by the choice of the type of dienoid polymer employed. A dienoid polymer with a high ratio of pendant vinyl groups to internal double bonds will allow incorporation of a higher percentage of the chlorinated moiety supplied by the DCMP than a dienoid polymer having a low ratio of pendant vinyl groups to internal double bonds. In general it can be said that the higher the degree of chlorination, the more fire retardant is the polymer modified in accordance with the present invention. To be considered fire retardant the modified dienoid polymers of this invention must contain at least about 25 percent by weight of chlorine. Preferred fire retardant polymers of this invention are those containing a minimum of about 30 percent by weight of chlorine. Modified dienoid polymers of this invention containing less than about 25 percent by weight of chlorine cannot be considered fire retardant, but are nevertheless useful as elastomers for the same purposes as the unmodified polymers.

Prior to recovery of the product from the reaction mixture unreacted DCMP is conveniently removed therefrom by boiling the reaction mixture with a weak alkali metal hydroxide solution. Alkali metal hydroxide reacts with excess DCMP to form its alkali metal salt, which is preferentially dissolved in the hot aqueous alkali metal hydroxide solution. After separating the aqueous layer the modified dienoid polymer may be conveniently recovered from the organic layer by removal of the solvent by evaporation.

The following examples, in which parts are by weight, are given to further illustrate the present invention.

EXAMPLE 1

13.5 parts of crude DCMP hydrate containing about 8 percent by weight of water were purified by recrystalization from 100 parts of 80 percent aqueous methanol. There were obtained 10.9 parts of purified DCMP hydrate. The purified DCMP hydrate was refluxed with 30 parts of xylene for about 15 minutes after which time no more water was evolved. There was thus obtained a solution of 10 parts of anhydrous DCMP in xylene. In this solution was dissolved one part of polybutadiene having 18.5 percent trans-1,4 double bonds, 5.5 percent cis-1,4 double bonds, and 76 percent pendant (1,2) vinyl units. The solution was then refluxed for 32 hours at a temperature of approximately 135° C. After that time there were added to the reaction mixture 100 parts of a 3 percent aqueous sodium hydroxide solution and the resulting mixture was boiled for a period of about 5 minutes. The aqueous and organic layers were then separated. Evaporation of the xylene from the organic layer yielded 5.5 parts of the desired DCMP-modified elastomer. The product had the same general appearance and consistency as the starting elastomer. It was soluble in xylene, carbon disulfide and carbon tetrachloride. It was insoluble in methanol, acetone, hexane and methyl cyclohexane. Infrared analysis showed the expected hydroxyl group at $2.84\mu$ and the expected unsaturation at $6.09\mu$ and $6.21\mu$. Absence of the carbonyl band at $5.5\mu$ indicated that no unreacted DCMP remained in the product. Elemental analysis showed chlorine content of 51.7 percent. A sample of the product was ignited with a gas flame. Upon removal from the flame, the product was self-extinguishing. The untreated polymer, on the other hand, continued to burn after removal from the flame.

EXAMPLE 2

Example 1 was repeated using 10 grams of purified anhydrous DCMP, 45 parts of xylene and 1 part of syndiotactic 1,2-polybutadiene having in excess of 95 percent pendant unsaturation. The mixture was refluxed for 24 hours. The clear solution was then extracted 3 times with 100 parts of a boiling, 3 percent aqueous sodium hydroxide solution to remove unreacted DCMP. Organic and aqueous layers were separated and the organic layer was evaporated to dryness. There were obtained 3 parts of a hard rubbery solid product. Infrared analysis of the product showed the presence of hydroxyl groups at $2.88\mu$ and the presence of unsaturation at $6.11\mu$ and $6.21\mu$. Absence of the carbonyl band at $5.5\mu$ indicated that no unreacted DCMP remained in the product. Elemental analysis showed a chlorine content of 45.3 percent. A sample of the product was ignited with a gas flame. Upon removal from the flame, the product was self-extinguishing. The untreated polymer, on the other hand, continued to burn after initial ignition.

EXAMPLE 3

10 parts of anhydrous DCMP and 4 parts of a low molecular weight polybutadiene having 20 percent of its double bonds in pendant (1,2) vinyl units were dissolved in 40 parts of xylene. The resulting solution was refluxed for a period of 24 hours, and was then extracted three times with 100 parts of a boiling, 3 percent aqueous solution of sodium hydroxide. Aqueous and organic layers were separated, and the organic layer was evaporated to yield 6.3 parts of a tough, sticky, rubbery product. Elemental analysis of the product showed a chlorine content of 33.4 percent. A sample of the product was ignited with a gas flame. Upon removal from the flame, the product was self-extinguishing. The untreated polymer, on the other hand, continued to burn after removal from the flame.

EXAMPLE 4

10 parts of anhydrous DCMP and 2 parts of butadiene-styrene copolymer containing 28 percent styrene, the butadiene part of which had 22.5 percent trans-1,4 double bonds, 7.5 percent cis-1,4 double bonds and 70 percent pendant (1,2) vinyl units, were dissolved in 30 parts of xylene. The resulting solution was refluxed for a period of 32 hours, and was then extracted three times with 100 parts of a boiling, 3 percent aqueous solution of sodium hydroxide. Aqueous and organic layers were separated, and the organic layer was evaporated to yield about 4 parts of a product similar in appearance and consistency to the starting elastomer. Infrared analysis showed the expected hydroxyl group at 2.88μ, and the expected unsaturated at 6.11μ and 6.26μ. Absence of the carbonyl band at 5.5μ indicated that no unreacted DCMP remained in the product.

Elemental analysis showed a chlorine content of 44.8 percent. A sample of the product was ignited with a gas flame. Upon removal from the flame, the product was self-extinguishing. The untreated polymer, on the other hand, continued to burn after removal from the flame.

This invention may be embodied in other forms or carried out in other ways without departing from the spirit or essential characteristics thereof. The present embodiments are therefore to be considered in all respects as illustrative and not restrictive on the scope of the invention which is defined by the appended claims.

We claim:

1. The reaction product obtained by interreacting decachlorooctahydro - 1,3,4 - metheno - 2H - cyclobuta[cd] pentalene-2-one and a dienoid polymer having pendant vinyl groups, which polymer is selected from the group consisting of
    (a) homopolymers of diolefins having the general formula $CH_2=CX—(CH_2)_n—CX'=CH_2$, wherein X and X' are independently selected from the group consisting of hydrogen, chlorine and methyl, and wherein $n$ is a whole number from 0 to 4, and
    (b) copolymers of diolefins having the general formula $CH_2=CX—(CH_2)_n—CX'=CH_2$, wherein X, X', and $n$ have the aforestated meanings, with a monomer selected from the group consisting of styrene, acrylonitrile, and isobutylene; said reaction product containing at least 25 percent by weight of chlorine derived from the decachlorooctahydro-1,3,4-metheno-2H-cyclobuta[cd]pentalene-2-one.

2. The reaction product of claim 1 obtained by interreacting decachlorooctahydro-1,3,4-metheno - 2H - cyclobuta[cd]pentalene-2-one and said dienoid polymer having pendant vinyl groups, in the presence of an inert organic solvent.

3. The reaction product of claim 2 wherein the dienoid polymer having pendant vinyl groups is selected from the group consisting of homopolymers of butadiene, 2-methyl-1,3-butadiene, 2-chloro-1,3-butadiene, and copolymers of butadiene, 2-methyl-1,3-butadiene, and 2-chloro-1,3-butadiene with monomers selected from the group consisting of styrene, acrylonitrile and isobutylene.

4. The reaction product of claim 2 wherein the dienoid polymer having pendant vinyl groups is selected from the group consisting of polybutadiene and copolymers of butadiene with a monomer selected from the group consisting of styrene, acrylonitrile and isobutylene.

5. The reaction product of claim 2 wherein the dienoid polymer having pendant vinyl groups is polybutadiene.

6. A method for the preparation of reaction products according to claim 3 which comprises reacting decachlorooctahydro-1,3,4-metheno-2H - cyclobuta[cd] pentalene-2-one and a dienoid polymer having pendant vinyl groups, which polymer is selected from the group consisting of
    (a) homopolymers of diolefins having the general formula $CH_2=CX—(CH_2)_n—CX'=CH_2$, wherein X and X' are independently selected from the group consisting of hydrogen, chlorine, and methyl, and wherein $n$ is a whole number from 0 to 4, and
    (b) copolymers of diolefins having the general formula $CH_2=CX—(CH_2)_n—CX'=CH_2$, wherein X, X', and $n$ have the aforestated meanings, with a monomer selected from the group consisting of styrene, acrylonitrile, and isobutylene,
in the presence of an inert organic solvent, and recovering the product from the reaction mixture.

7. A method according to claim 6 wherein the reactants are reacted in a weight ratio of from 0.2 to 20 parts of decachlorooctahydro-1,3,4-metheno-2H-cyclobuta[cd] pentalene-2-one per part of dienoid polymer having pendant vinyl groups.

8. A method according to claim 7 wherein the reaction is carried out at a temperature of between 50° C. and 200° C.

9. A method according to claim 6 wherein said dienoid polymer having pendant vinyl groups is selected from the group consisting of
    (a) homopolymers of butadiene, 2-methyl-1,3-butadiene, 2-chloro-1,3-butadiene, and
    (b) copolymers of butadiene, 2-methyl-1,3-butadiene and 2-chloro-1,3-butadiene with monomers selected from the group consisting of styrene, acrylonitrile, and isobutylene.

10. A method according to claim 9 wherein the reactants are reacted in a weight ratio of from 0.2 to 20 parts of decachlorooctahydro - 1,3,4 - metheno - 2H - cyclobuta[cd]pentalene-2-one per part of dienoid polymer having pendant vinyl groups.

11. A method according to claim 10 wherein the reaction is carried out at a temperature of between 50° C. and 200° C.

References Cited

UNITED STATES PATENTS

| | | | |
|---|---|---|---|
| Re. 24,435 | 2/1958 | Gilbert et al. | 260—586 |
| 3,205,196 | 9/1965 | Creighton | 260—45.75 |
| 3,332,892 | 7/1967 | Middleton | 260—66 XR |

OTHER REFERENCES

Gaylord, N. G., and Mark, H. F., Linear and Stereoregular Addition Polymers: Polymerization with Controlled Propagation, Interscience Publishers, Inc., N.Y. (1959), pp. 66–71.

HAROLD D. ANDERSON, Primary Examiner

L. M. PHYNES, Assistant Examiner

U.S. Cl. X.R.

260—30.8, 33.6, 33.8

PO-1050
(5/69)

UNITED STATES PATENT OFFICE
CERTIFICATE OF CORRECTION

Patent No. 3,481,902  Dated December 2, 1969

Inventor(s) Everett E. Gilbert

It is certified that error appears in the above-identified patent and that said Letters Patent are hereby corrected as shown below:

Column 1, line 30, "adavntage" should be -- advantage --.

Column 4, line 60, "soild" should be -- solid --.

Column 5, line 27, "unsaturated" should be -- unsaturation --.

Claim 6, column 6, line 9, "3" should be --2--.

SIGNED AND
SEALED
MAR 10 1970

(SEAL)
Attest:

Edward M. Fletcher, Jr.
Attesting Officer

WILLIAM E. SCHUYLER, JR.
Commissioner of Patents